Sept. 18, 1928.
L. U. McABEE
1,684,677
BODY AND CHASSIS CONSTRUCTION FOR MOTOR VEHICLES
Filed April 21, 1924
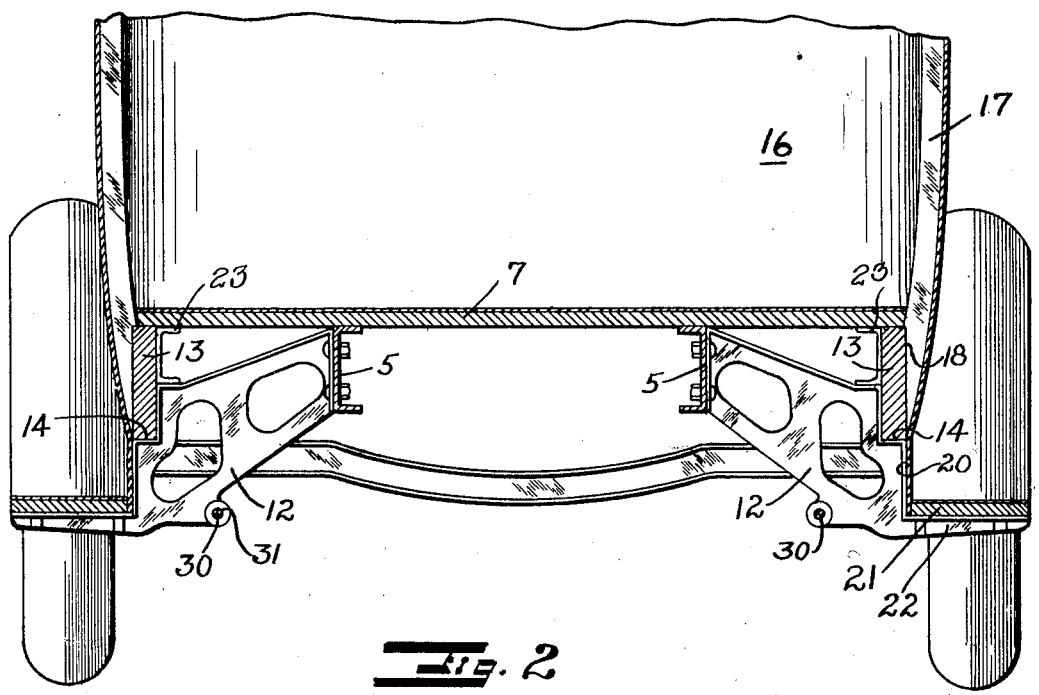
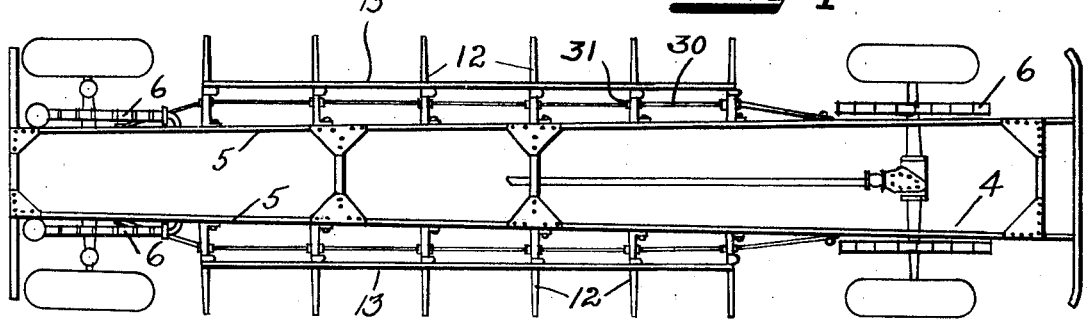
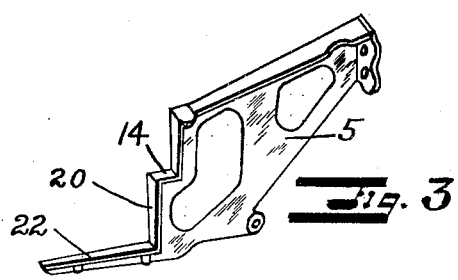
INVENTOR.
Louis U. McAbee
BY Joseph B. Gardner
ATTORNEY.

Patented Sept. 18, 1928.

1,684,677

UNITED STATES PATENT OFFICE.

LOUIS U. McABEE, OF OAKLAND, CALIFORNIA, ASSIGNOR TO CALIFORNIA TRANSIT COMPANY, OF STOCKTON, CALIFORNIA, A CORPORATION OF CALIFORNIA.

BODY AND CHASSIS CONSTRUCTION FOR MOTOR VEHICLES.

Application filed April 21, 1924. Serial No. 707,917.

My invention relates to body and chassis construction for vehicles, and particularly to motor buses or passenger carrying motor vehicles of large size.

Motor buses, as heretofore constructed with a standard chassis and body, appear more or less top-heavy when compared with buses having a chassis and body of special construction calculated to provide a vehicle having a relatively low center of gravity. An object, therefore, of the present invention is to provide means for adapting and combining standard forms of chassis and body to form a passenger-carrying motor vehicle resembling the type of motor bus with the low center of gravity.

Another object of the invention is to provide a construction of the character described which will enable the chassis to offer increased resistance to distortion.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to said drawings:

Figure 1 is a plan view of a standard chassis equipped in accordance with my invention.

Figure 2 is a transverse section of the chassis and a portion of the vehicle body.

Figure 3 is a perspective view of a supporting member of my invention.

As illustrated in the drawings the chassis 4 is what may be termed a standard type such as is usually carried on four wheels and includes longitudinal members 5 resiliently mounted on the axles of the vehicle by means of springs 6. The chassis is of extremely rigid construction since it is adapted to support a body capable of holding a large number of passengers.

The flooring 7 of the body is usually laid on the longitudinal members 5, and heretofore the pillars and main shell of the body both terminated at the flooring or at the top of the members 5. The latter, however, in standard chassis, are generally of such height above the ground, that the body when placed on the chassis appears somewhat top heavy in comparison with motor buses built specially to present a low appearing structure. In accordance with the present invention the pillars and shell are made to extend below the flooring, and in fact, considerably below the bottom of the longitudinal members, thus giving the vehicle the appearance of having a much lower center of gravity than those heretofore built and equipped with standard chassis.

In carrying out the invention, I provide a plurality of transverse brackets 12 which are bolted or otherwise firmly fixed to the longitudinal members 5 and extend outwardly therefrom. Arranged under the transverse extremities of the flooring which as shown in Figure 2 extends outward considerably beyond the members 5, are sills 13 which lie substantially parallel to the members 5 and rest in a seat 14 formed in each of the brackets 12. The sills are much larger vertically than the members 5, and since the tops of the sills and members are preferably aligned horizontally, the bottom of the sills will lie considerably lower than the bottom of said members. Provided on opposite sides of the body 16 of the vehicle are pillars 17 which extend downwardly along the outer side of the sills and terminate adjacent the bottom thereof. As here shown the pillars are preferably mortised as at 18 so as to firmly set on the sills. The main shell of the body is arranged on the outer side of the pillars and like the latter extends downwardly to the bottom of the sills. In fact if desirable and as here shown said shell continues along the vertical face 20 of the bracket to the running board 21, the latter being preferably supported on an arm 22 formed integrally with the bracket. It will now be apparent that with the pillars and shell proper thus extending so much closer to the ground than heretofore, that in spite of the comparatively high chassis, the vehicle will give the appearance of having a comparatively low center of gravity.

The bracket, in addition to being fixed to the members 5, may be secured to the floor members and if desirable to the sills, by means of a suitable strap 23, thereby firmly holding the various parts together and providing increased strength for supporting the running board.

Means are provided for enhancing the resistance of the brackets against sidewise displacement thereof longitudinally of the chassis. As here shown said means comprises a rod 30 which passes through apertures 31 formed in the bracket, and is secured at its ends to the associated member 5. A suitable nut or other stop is preferably provided on the rod at each side of each of the brackets, thus causing the latter to be firmly held in desired position.

It will be clear the various additions to the chassis not only afford advantages in the desired appearance of the vehicle, but add materially to the ability of the vehicle to withstand torsional strains.

I claim:

1. In a chassis for motor vehicles, the combination with spaced longitudinal members resiliently carried on the vehicle axles, of longitudinally extending body supporting sills spaced outwardly from said members, and brackets supported by said members providing the primary support of said sills and the running boards of the vehicle, the parts of each bracket engaging said members and sills being directly connected whereby said sills are arranged to be supported in fixed spaced relation from said members.

2. In a chassis construction for vehicles, a longitudinal member, a sill spaced outwardly therefrom and extending parallel thereto, transversely extending brackets secured to said member and cooperative to provide the sole support for said sill and to dispose it in fixed spaced relation from said member, and provided with an extension for supporting the running board of the vehicle, and a longitudinally extending tie-rod fixed to said brackets holding them against lateral displacement.

3. As a part of a vehicle frame, a bracket comprising a top portion adapted to lie transversely of and be interposed between a pair of longitudinally extending frame elements and secured at one end to one of said elements, a seat formed at the other end of said top portion for the supporting reception of the other element, a downwardly extending portion depending from said top portion along which the shell of the vehicle body is adapted to extend, a horizontally projecting portion extending outwardly from said downwardly extending portion adapted for supporting the running board of the vehicle, all of said portions being coplanar and rigidly related in their plane whereby said sills are supported entirely by and in fixed spaced relation from said members.

In testimony whereof, I have hereunto set my hand at Oakland, this 8th day of April, 1924.

LOUIS U. McABEE.